United States Patent
Denize et al.

(10) Patent No.: US 9,770,697 B2
(45) Date of Patent: Sep. 26, 2017

(54) CLOSING COVER FOR A CONTAINER PROVIDED WITH A SEAL

(75) Inventors: Cyril Denize, Leves (FR); Patrick Saint, Chartres (FR)

(73) Assignee: FILLON TECHNOLOGIES, Faverolles (FR)

( * ) Notice: Subject to any disclaimer, the term of this patent is extended or adjusted under 35 U.S.C. 154(b) by 475 days.

(21) Appl. No.: 13/699,895

(22) PCT Filed: May 13, 2011

(86) PCT No.: PCT/FR2011/051077
§ 371 (c)(1),
(2), (4) Date: Nov. 26, 2012

(87) PCT Pub. No.: WO2011/154629
PCT Pub. Date: Dec. 15, 2011

(65) Prior Publication Data
US 2013/0121105 A1    May 16, 2013

(30) Foreign Application Priority Data
Jun. 7, 2010 (FR) ..................... 10 54451

(51) Int. Cl.
*B01F 15/00* (2006.01)
*B01F 7/16* (2006.01)
(Continued)

(52) U.S. Cl.
CPC ...... *B01F 15/00779* (2013.01); *B01F 7/1695* (2013.01); *F16J 15/164* (2013.01);
(Continued)

(58) Field of Classification Search
CPC ................................. B01F 15/00779
(Continued)

(56) References Cited

U.S. PATENT DOCUMENTS 1,887,006 A * 11/1932 Baensch ................. F16J 15/40
                                                              277/350
2,606,779 A    8/1952 Thornton
(Continued)

FOREIGN PATENT DOCUMENTS

DE    20 2009 001372 U1    8/2009
EP         0 633 055 A1    1/1995
(Continued)

OTHER PUBLICATIONS

International Search Report, dated Aug. 31, 2011, from corresponding PCT application.

*Primary Examiner* — Abbas Rashid
(74) *Attorney, Agent, or Firm* — Ipsilon USA, LLP

(57) ABSTRACT

A lid (2) for closing a container (4) of liquid, the lid being provided with a spindle passageway (20) enabling an elongate body (30) of a stirrer member (3) for stirring the liquid to pass through the lid (2), which elongate body is designed to be mounted to rotate in the spindle passageway (20), the spindle passageway including a portion (23) for receiving the elongate body (30) and designed to allow the elongate body (30) of the stirrer member (3) to pass through it, and a portion (21) for receiving a seal (1), which portion has an inside diameter greater than the inside diameter of the portion (23) for receiving the elongate body (30) and receives an annular seal (1) designed to allow the elongate body of the stirrer member to pass through it. The inside peripheral face of the annular seal (1) is provided with a helical lip (120).

10 Claims, 2 Drawing Sheets

Figure 1:
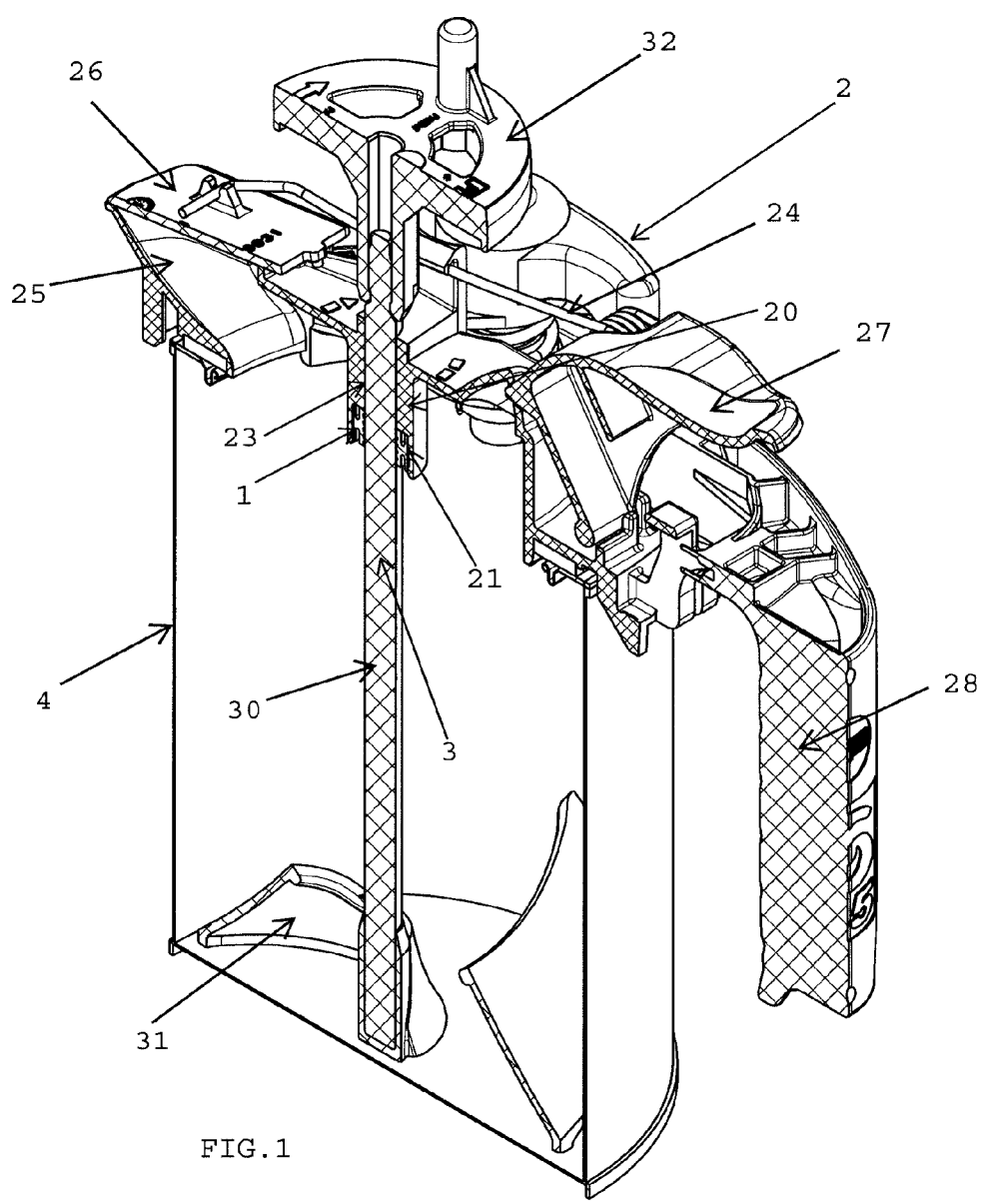

(51) Int. Cl.
*F16J 15/16* (2006.01)
*F16J 15/3236* (2016.01)
*F16J 15/3244* (2016.01)
*B01F 7/00* (2006.01)

(52) U.S. Cl.
CPC ....... *F16J 15/3236* (2013.01); *F16J 15/3244* (2013.01); *B01F 7/00275* (2013.01); *B01F 2015/00084* (2013.01); *B01F 2015/00103* (2013.01); *B01F 2215/005* (2013.01)

(58) Field of Classification Search
USPC .......... 366/247–248, 331, 605; 277/354, 430
See application file for complete search history.

(56) References Cited

U.S. PATENT DOCUMENTS

| | | | | | |
|---|---|---|---|---|---|
| 2,793,012 | A * | 5/1957 | Wolf | ............... | A45D 34/048 215/228 |
| 3,162,338 | A * | 12/1964 | Grubelic | ............... | B01F 7/1695 220/325 |
| 3,209,387 | A * | 10/1965 | Lukesch | ............... | A45D 34/048 206/15.2 |
| 3,228,342 | A * | 1/1966 | Page | ............... | A47L 15/4225 277/351 |
| 3,738,760 | A * | 6/1973 | Madeira | ............... | A45D 34/048 401/195 |
| 3,894,723 | A * | 7/1975 | Sanders | ............... | B01F 13/002 366/248 |
| 3,901,167 | A * | 8/1975 | Reese | ............... | E05G 1/026 109/64 |
| 3,912,284 | A * | 10/1975 | Gosling | ............... | F16J 15/406 277/351 |
| 3,915,351 | A * | 10/1975 | Kiralfy | ............... | F04D 29/167 222/385 |
| 4,235,446 | A * | 11/1980 | Verhey | ............... | F16J 15/54 277/409 |
| 4,236,721 | A * | 12/1980 | Pennock | ............... | F16J 15/406 277/430 |
| 4,280,632 | A * | 7/1981 | Yuhara | ............... | B65D 41/02 215/331 |
| 4,380,302 | A * | 4/1983 | Broad | ............... | 220/235 |
| 4,401,228 | A * | 8/1983 | Baldelli | ............... | B65D 39/12 215/360 |
| 4,483,623 | A * | 11/1984 | Eaton | ............... | B01F 13/0827 366/247 |
| 4,512,666 | A * | 4/1985 | O'Connell | ............... | B01F 13/0827 366/249 |
| 4,880,146 | A * | 11/1989 | Hudgins | ............... | B65D 23/04 222/192 |
| 4,905,862 | A * | 3/1990 | Dwinell | ............... | B65D 39/084 220/288 |
| 4,917,520 | A * | 4/1990 | Reid | ............... | A45D 40/265 401/126 |
| 4,976,547 | A * | 12/1990 | Hisanaga | ............... | B29B 7/408 366/170.3 |
| 5,167,449 | A * | 12/1992 | Killough | ............... | B01F 7/0005 366/247 |
| 5,172,992 | A * | 12/1992 | Ackermann | ............... | A45D 34/048 401/129 |
| 5,251,979 | A * | 10/1993 | Larsen | ............... | B01F 7/1695 366/248 |
| 5,450,368 | A * | 9/1995 | Kubota | ............... | B01F 7/00808 241/243 |
| 5,498,076 | A | 3/1996 | Krzywdziak | | |
| 5,839,825 | A | 11/1998 | Krzywdziak | | |
| 7,490,976 | B2 * | 2/2009 | Bucher | ............... | B01F 7/008 241/243 |
| 7,497,348 | B2 * | 3/2009 | Johnson et al. | ............... | 220/4.22 |
| 7,823,736 | B1 * | 11/2010 | Pugne | ............... | B65D 47/0838 215/232 |
| 8,408,418 | B2 * | 4/2013 | Kuzelka | ............... | B01F 15/00006 220/600 |
| 2003/0202724 | A1 * | 10/2003 | Harclerode | ............... | 384/462 |
| 2007/0056447 | A1 * | 3/2007 | Swartz et al. | ............... | 99/287 |
| 2009/0116335 | A1 * | 5/2009 | Wild et al. | ............... | 366/249 |
| 2011/0003374 | A1 | 1/2011 | Van Den Boogaard et al. | | |

FOREIGN PATENT DOCUMENTS

| | | |
|---|---|---|
| EP | 0 820 879 A1 | 1/1998 |
| EP | 1 628 051 A1 | 2/2006 |
| EP | 2 179 788 A1 | 4/2010 |

\* cited by examiner

CLOSING COVER FOR A CONTAINER PROVIDED WITH A SEAL

The present invention relates generally to seals for container lids that are equipped with or designed to be equipped with stirrer means.

The invention relates more particularly to a lid for closing a container of liquid, said lid being provided with a spindle passageway enabling an elongate body of stirrer means to pass through the lid, which elongate body is designed to be mounted to rotate in said spindle passageway, said spindle passageway including a portion for receiving an annular seal designed to allow said elongate body of the stirrer means to pass through it.

The function of the seal is to provide sealing between the closure lid and the rotary elongate body of the stirrer means that passes through the lid. In particular, the seal makes it possible to avoid evaporation of solvent vapors present in the liquid contained in the container, and to avoid leakage of said liquid, e.g. while the stirrer means are rotating, or while the container is being handled outside the storage cabinet.

Lids such as the above-described lid are known from the state of the art, in particular from Patent EP 0 820 879. However, lids known from the state of the art use simple lip seals for sealing them. A simple lip seal is not fully satisfactory as regards sealing the lid at the spindle passageway through which the rotary elongate body of the stirrer means passes.

In addition, it is observed that a simple lip seal wears prematurely on coming into contact with the abrasive elements present in the liquid contained in the container, thereby rapidly preventing the lip seal from performing its sealing function.

It is also remarked that the portion provided in the spindle passageway for receiving the seal can have dimensional variations that give rise to the annular seal being positioned in the recess in such a manner that the axis of the opening in the annular seal is offset relative to the axis of the spindle passageway, thereby giving rise to a problem of centering the elongate body of the stirrer means while it is being mounted in the spindle passageway through the lid. The axis of the seal being off-center relative to the axis of the spindle passageway also raises problems of the inside wall of the seal being a tight fit against the elongate body of the stirrer means that passes through it, and thus raises sealing problems.

An object of the present invention is to propose a novel lid equipped with a seal making it possible to improve the sealing between the lid and the elongate body of the stirrer means, i.e. at the spindle passageway provided through the lid.

Another object of the invention is to propose a novel lid equipped with a seal making it possible to improve the centering of the stirrer means relative to the spindle passageway provided in the lid while said stirrer means are being mounted through the lid.

Another object of the invention is to propose a novel lid equipped with a seal that has a design making it possible to limit the wear on said seal due to the abrasive substances contained in the container closed by the lid.

To this end, the invention provides a lid for closing a container of liquid, said lid being provided with a spindle passageway enabling an elongate body of stirrer means to pass through the lid, which elongate body is designed to be mounted to rotate in said spindle passageway, said spindle passageway including a portion for receiving an annular seal designed to allow said elongate body of the stirrer means to pass through it, said lid being characterized in that the inside peripheral face of said annular seal is provided with a helical lip.

By means of its turns, the helical lip forms a succession of barriers for the liquid, thereby making it possible to improve the dynamic sealing of the lid at the spindle passageway.

In particular, if one turn of the lip is breached by the liquid, the next turn forms another barrier that maintains sealing between the spindle passageway and the stirrer means that pass through it.

In addition, implementing the sealing lip of the seal in the form of a helical thread with a plurality of consecutive turns makes it possible to limit the tightness of the fit of the lip of each turn against the body of the stirrer means, and thus to reduce wear on the seal and on the elongate body of the stirrer means.

Such a limitation of tightness of fit, as made possible by using a helical lip, enables the rotary body of the stirrer means to be made of a glass-reinforced plastics material that is less costly than metal but that is more abrasive for the lip.

Finally, such a design for the annular seal with a helical lip makes it possible to avoid having to equip the seal with a spring ring at the lip(s), or with holding reinforcement at the outer wall of the seal, thereby limiting the cost of the seal and thus the cost of the lid.

The seal thus makes it possible to achieve a level of fluid-tightness that is sufficient, in particular for all paints used for automobile bodywork.

Preferably, the annular seal is a seal having two peripheral walls interconnected via a flexible link.

Preferably, said walls are referred to respectively as the inner wall and as the outer wall, they are substantially coaxial, and they are spaced apart by a flexible link of the bridge type preferably extending half way up said walls, in the circumferential midplane of said walls.

Advantageously, the turns are spaced apart axially from one another so as to define a helical groove between them. The handedness of the turns of the helical thread is chosen such that, for a given direction of rotation of the stirrer means, any liquid present in the helical groove defined between the turns is driven back into the container by said stirrer means rotating.

The inside peripheral face of said seal is also provided with a circular sealing lip situated in the vicinity of the opening face of the annular seal that is opposite from its opening face that is designed to face towards the container.

This circular sealing lip achieves static sealing making it leaktight to solvent vapors during static storage, and to liquids while the container is being handled, the circular lip making it possible to close off the helical groove defined by the turns of the helical thread.

The helical lip limits access by the liquid to the circular sealing lip, thereby making it possible to limit the wear on the circular lip that forms the last sealing barrier. The substance must begin by rising up through the thread before it reaches the sealing lip. Thus, with abrasive paint, wear on the circular sealing lip is more gradual, thereby making it possible to extend the lifetime of the substance significantly.

In particular, the abrasive substances are generally viscous and therefore penetrate into the thread in limited manner, so that wear on the seal is restricted to a small height.

Preferably, said annular seal is made of a thermoplastic material, such as a thermoplastic elastomer.

According to an advantageous characteristic of the invention, said lid is equipped with said stirrer means that have their elongate body, such as a rod, rotatably mounted through the spindle passageway of the lid and through the seal.

Preferably, at or in the vicinity of one end, said elongate body is equipped with at least one stirrer member such as a paddle, and at or in the vicinity of the opposite end, said elongate body is provided with an engagement portion for driving said rotary elongate body of the stirrer means in rotation.

The invention also provides a container for containing liquid that is preferably paint, and equipped with a lid for closing it, said container being characterized in that said lid is as described above.

The invention also provides an annular seal for a lid for closing a container of liquid, said lid being provided with a spindle passageway enabling an elongate body of stirrer means to pass through the lid, which elongate body is designed to be mounted to rotate in said spindle passageway, said spindle passageway including a portion for receiving said annular seal, said annular seal being characterized in that the inside peripheral face of said annular seal is provided with a helical lip.

Figure 2:
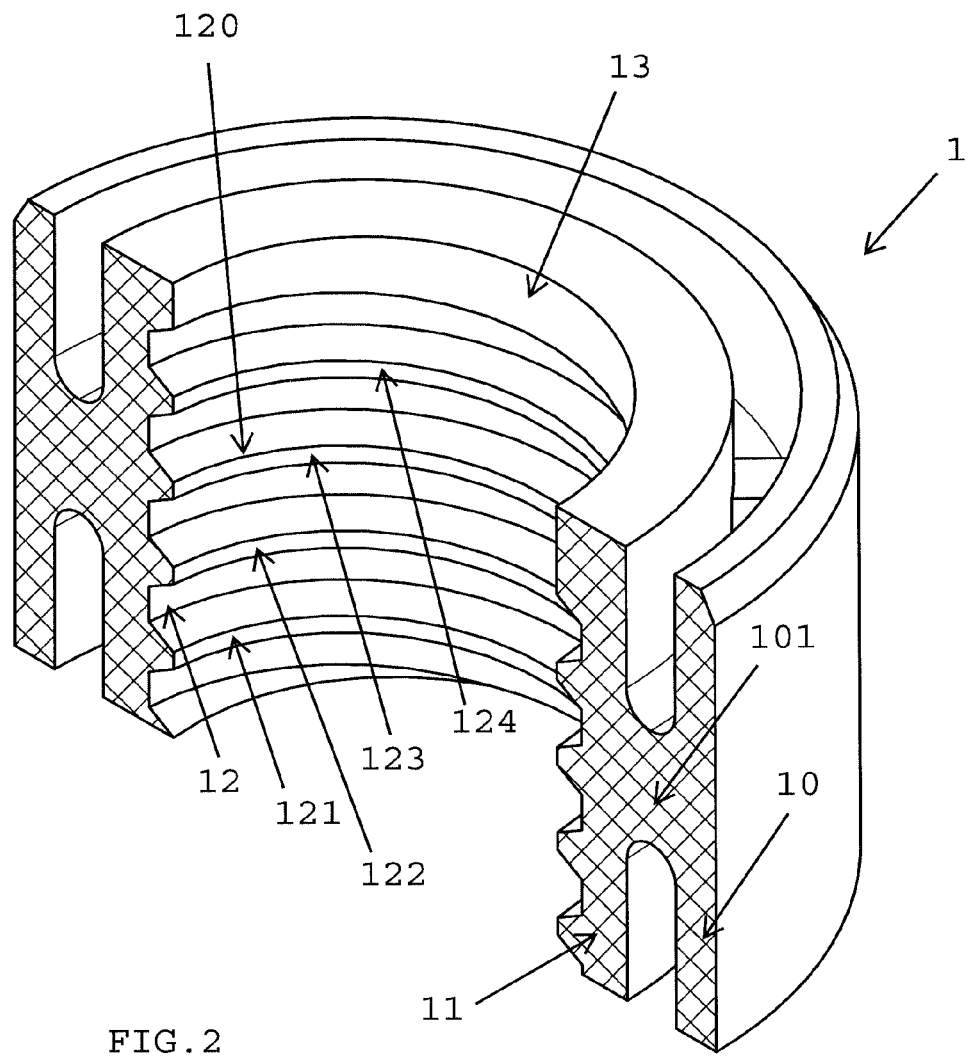

The invention can be well understood on reading the following description of embodiments given with reference to the accompanying drawings, in which:

FIG. 1 is a view in axial section and in perspective showing a paint can closed with a lid of the invention equipped with a seal, in the state in which the body of the stirrer means is inserted through the lid and through said seal; and FIG. 2 is a view in axial section and in perspective showing the seal of the lid of FIG. 1;

With reference to the figures, and as outlined above, the invention relates to a lid 2 for closing a liquid container 4, and preferably for closing a paint can.

Said lid 2 is provided with a spindle passageway 20 enabling an elongate body 30 of stirrer means 3 to pass through the lid 2, which elongate body is designed to be mounted to rotate in said spindle passageway 20 for the purpose of stirring said liquid. Said spindle passageway comprises firstly a portion 23 for receiving the elongate body 30 and designed to allow the elongate body of the stirrer means 3 to pass through it, and secondly a portion 21 for receiving a seal 1, which portion has an inside diameter greater than the inside diameter of the portion 23 for receiving the elongate body 30. Said portion 21 for receiving the seal 1 receives an annular seal 1 designed to allow said elongate body 30 of the stirrer means 3 to pass through it. Said stirrer means 3 make it possible to keep the substance contained in the container homogeneous, in particular when the container is a paint pot.

As shown in FIG. 1, the lid 2 of the invention is designed to close a pot or some other container 4 of liquid. This lid 2 is a precision lid that has a spout 25 provided with a slidably mounted closure flap 26 biased by a spring 24 of the hairpin type. This flap 26 is caused to move by a pivotally mounted opening lever 27. Said lid 2 is handled via a handle 28 for taking hold of it.

The container 4 and its lid 2 may be received in a storage cabinet provided with one or more locations for storing said container. Each location is equipped with means for actuating the stirrer means so as to stir the liquid by rotating the body of the stirrer means. In particular, said lid 2 may be used for "suspended" containers that are suspended from their lids, or for "standing" containers that are stood in a stirring cabinet. The lid is equipped with means for fastening to the container 4. Advantageously, the lid may be adapted to fit cans of various diameters.

For standing containers, the lid 2 is mounted to move in translation relative to the elongate body 30 or "spindle" of the stirrer means 3, thereby making it adaptable to fit cans of various depths, e.g. corresponding to capacities of 0.5 liters (L) and of 1 L.

In the example shown in FIG. 1, said lid 2 is equipped with said stirrer means 3 that have their elongate body 30, such as a rod, rotatably mounted through the spindle passageway 20 of the lid 2 and through the seal 1. At or in the vicinity of one end, said elongate body 30 is equipped with at least one stirrer member 31 such as a paddle, and at or in the vicinity of the opposite end, said elongate body 30 is provided with an engagement portion 32 for driving said rotary elongate body 30 of the stirrer means 3 in rotation. Said engagement portion may either be a drive fork for "standing" cans, or a drive cog for "suspended" cans. In particular, in the example shown in FIG. 1, the spindle 30 carries a stirrer paddle 31 which, by being driven in rotation via the rotary body of the stirrer means, makes it possible to stir the paint contained in the pot.

In a manner characteristic of the invention, the inside peripheral face of said annular seal 1 is provided with a helical lip 120.

In other words, the seal 1 is positioned in a recess 21 provided in the spindle passageway 20, said recess 21 for said seal being coaxial with the spindle passageway 20 and being situated beside the bottom face, i.e. beside the face that faces towards the inside of the container or away from the direction facing the top face of said lid that is equipped with the mechanism for closing off the spout. In particular, the recess 21 is formed by a shoulder in the spindle passageway 20 so that said recess opens out in the bottom face of the lid, thereby enabling the seal to be inserted into its recess and extracted therefrom from the bottom face of the lid.

The inside diameter of said annular seal 1, measured at the crest line of the thread, which diameter is such as to be a snug fit on the elongate body 30 of the stirrer means 3, is preferably significantly less than the inside diameter of the wall of the portion 23 of the spindle passageway 20 that is designed to guide the elongate body 30 of the stirrer means 3 in rotation with clearance.

The annular seal 1 is a seal having two peripheral walls 10, 11 interconnected via a flexible link 101. Said walls are referred to respectively as the inner wall and as the outer wall 10, they are substantially coaxial, and they are spaced apart by a flexible link 101 of the bridge type preferably extending half way up said walls, in the circumferential midplane of said walls.

The flexible link 101 of the bridge type forms a circular platform interconnecting said walls. The double wall has an H-shaped cross-section.

The flexible link 101, which is elastically deformable, enables the elongate body 30 of the stirrer means 3 to be properly centered through the seal 1 and through the spindle passageway 20. In particular, said flexible link 101 makes it possible to achieve self-alignment between the spindle passageway 20, or bearing, the lid 2, and the helical lip 120 of the seal 1 on inserting the elongate body 30 of the stirrer means 3 through the spindle passageway 20 and through the seal 1.

The flexible link 101 also makes it possible to dissociate the outer wall 10 and the inner wall 11 from each other, these two walls having different functions. The function of the wall 10 is to hold the seal 1 in its recess 21 as a force fit. The function of the wall 11 is to provide sealing by being a snug fit on the elongate body 30 of the stirrer means 3.

As shown more particularly in FIG. 2, the helical lip 120 is made up of a plurality of turns 121, 122, 123, 124 forming the helical thread of the helical lip 120 of the seal.

The turns 121, 122, 123, 124 are spaced apart axially from one another so as to define a helical groove between them. Thus, any liquid that penetrates between the seal 1 and the elongate body 30 of the stirrer means 3 runs down along said groove 12 and falls by gravity into the paint pot 4 by flowing along said helical path.

Driving back any of said liquid that has risen into the helical groove 12 is also improved by the rotation of the stirrer means 3. The handedness of the helical lip 120 is defined as a function of the direction of rotation of the elongate body 30 of the stirrer means so as to participate in driving said liquid back towards the inside of the container. When the elongate body 30 of the stirrer means 3 is designed to be turned clockwise, the helical thread corresponds to a right-hand thread. Conversely, when the elongate body 30 is designed to be turned counterclockwise, the helical thread corresponds to a left-hand thread. A "right-hand thread" means a thread that, seen in an axial view, runs backwards on turning in the clockwise direction, and a "left-hand thread" runs backwards on turning in the counterclockwise direction.

The inside peripheral face of said seal 1 is also provided with a circular sealing lip 13 situated in the vicinity of the "top" opening face of the annular seal 1 opposite from its "bottom" opening face that is designed to face towards the container 4. In other words, said circular sealing lip 13 is situated in the top portion of the seal 1, when said seal 1 is in the mounted state in which it is mounted in the lid 2 that closes the container 4.

This circular lip 13 closes the groove 12 formed by the helical lip 120 at the top. It thus makes it possible to provide static sealing preventing the solvent vapors and the liquids from leaking.

Said annular seal 1 is made of a thermoplastic material, such as a thermoplastic elastomer.

The present invention is in no way limited to the embodiments described and shown, and the person skilled in the art can make any variant to them that lies within the spirit of the invention.

The invention claimed is:

1. An enclosure arrangement for closing a container of liquid comprising:
a lid; and
a stirrer,
wherein said lid has a spindle passageway adapted to receive a rotatable elongate body of said stirrer, said rotatable elongate body of said stirrer having a uniform diameter at said spindle passageway and within said container, said spindle passageway being adapted to allow the rotatable elongate body to rotate in said spindle passageway,
and wherein said spindle passageway includes an annular seal with an opening of a same diameter as said rotatable elongate body of said stirrer, adapted to receive the rotatable elongate body, the opening having an inside peripheral face with a helical sealing lip, said helical sealing lip engaging the outside surface of said rotatable elongate body of said stirrer to maintain sealing between said rotatable elongate body of said stirrer and said annular seal, said annular seal having a circular sealing lip located above and spaced from the helical sealing lip when said annular seal is in its mounted state in said lid closing said container, the circular sealing lip being adjacent to an opening of the annular seal opposite a surface of the annular seal adapted to face inside the container.

2. The enclosure arrangement according to claim 1, wherein the annular seal has two peripheral walls interconnected via a flexible link.

3. The enclosure arrangement according to claim 2, wherein said two peripheral walls are substantially coaxial, and are spaced apart by the flexible link that extends half way up said two peripheral walls, in a circumferential midplane of said two peripheral walls.

4. The enclosure arrangement according to claim 1, wherein the helical sealing lip is made up of a plurality of turns.

5. The enclosure arrangement according to claim 4, wherein the plurality of turns are spaced apart axially from one another so as to define a helical groove between them.

6. The enclosure arrangement according to claim 5, wherein a handedness of the plurality of turns drives liquid present in the helical groove back into the container by said stirrer rotating.

7. The enclosure arrangement according to claim 1, wherein said annular seal is made of a thermoplastic material.

8. The enclosure arrangement according to claim 1, further comprising the stirrer with the rotatable elongate body rotatably mounted through the spindle passageway of the lid and through the annular seal.

9. The enclosure arrangement according to claim 1, wherein the container contains paint, said lid configured to close the container.

10. The enclosure arrangement according to claim 1, wherein the helical sealing lip is closer to the surface of the annular seal adapted to face the container than the circular sealing lip, and wherein the helical sealing lip is separated from a circular sealing groove.

\* \* \* \* \*